(12) United States Patent
Tropper

(10) Patent No.: US 6,678,091 B2
(45) Date of Patent: Jan. 13, 2004

(54) SYSTEM AND METHOD TO SYNCHRONIZE ONE OR MORE SHUTTERS WITH A SEQUENCE OF IMAGES

(76) Inventor: Matthew Bruce Tropper, 30 Southern Pky., Plainview, NY (US) 11803

( * ) Notice: Subject to any disclaimer, the term of this patent is extended or adjusted under 35 U.S.C. 154(b) by 20 days.

(21) Appl. No.: 09/782,868

(22) Filed: Feb. 14, 2001

(65) Prior Publication Data

US 2001/0028413 A1 Oct. 11, 2001

Related U.S. Application Data

(60) Provisional application No. 60/182,979, filed on Feb. 16, 2000.

(51) Int. Cl.$^7$ .......................... G02B 27/22; H04N 13/04; G09G 5/00
(52) U.S. Cl. .......................... 359/462; 359/464; 348/53; 345/6
(58) Field of Search ................................. 359/462, 464, 359/465; 345/6, 7, 8, 9; 348/56, 51, 53

(56) References Cited

U.S. PATENT DOCUMENTS

| | | | | |
|---|---|---|---|---|
| 5,245,319 A | * | 9/1993 | Kilian | 359/462 |
| 5,796,373 A | * | 8/1998 | Yen | 345/6 |
| 5,818,399 A | * | 10/1998 | Omori et al. | 359/464 |
| 5,821,989 A | * | 10/1998 | Lazzaro et al. | 359/465 |

\* cited by examiner

Primary Examiner—Andrey Chang
(74) Attorney, Agent, or Firm—Matthew B. Tropper

(57) ABSTRACT

A system and method to synchronize one or more shutters on user-worn headgear with a sequence of images shown on a display by initially synchronizing the shutter(s) with the sequence of images using an initial synchronization signal generated externally to the headgear and by maintaining synchronization of the shutter(s) with the sequence of images using an ongoing synchronization signal generated independently by the headgear.

15 Claims, 14 Drawing Sheets

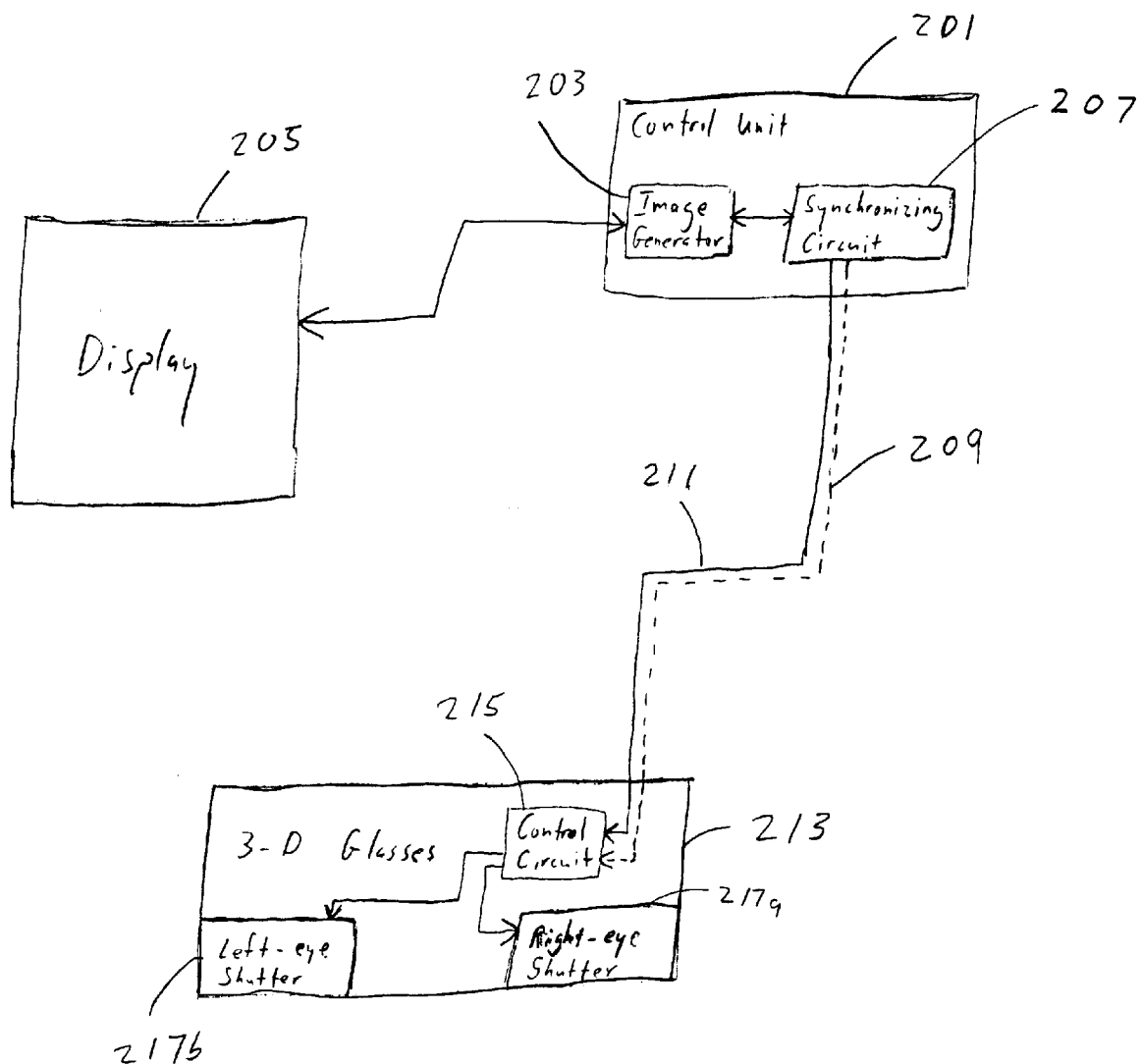

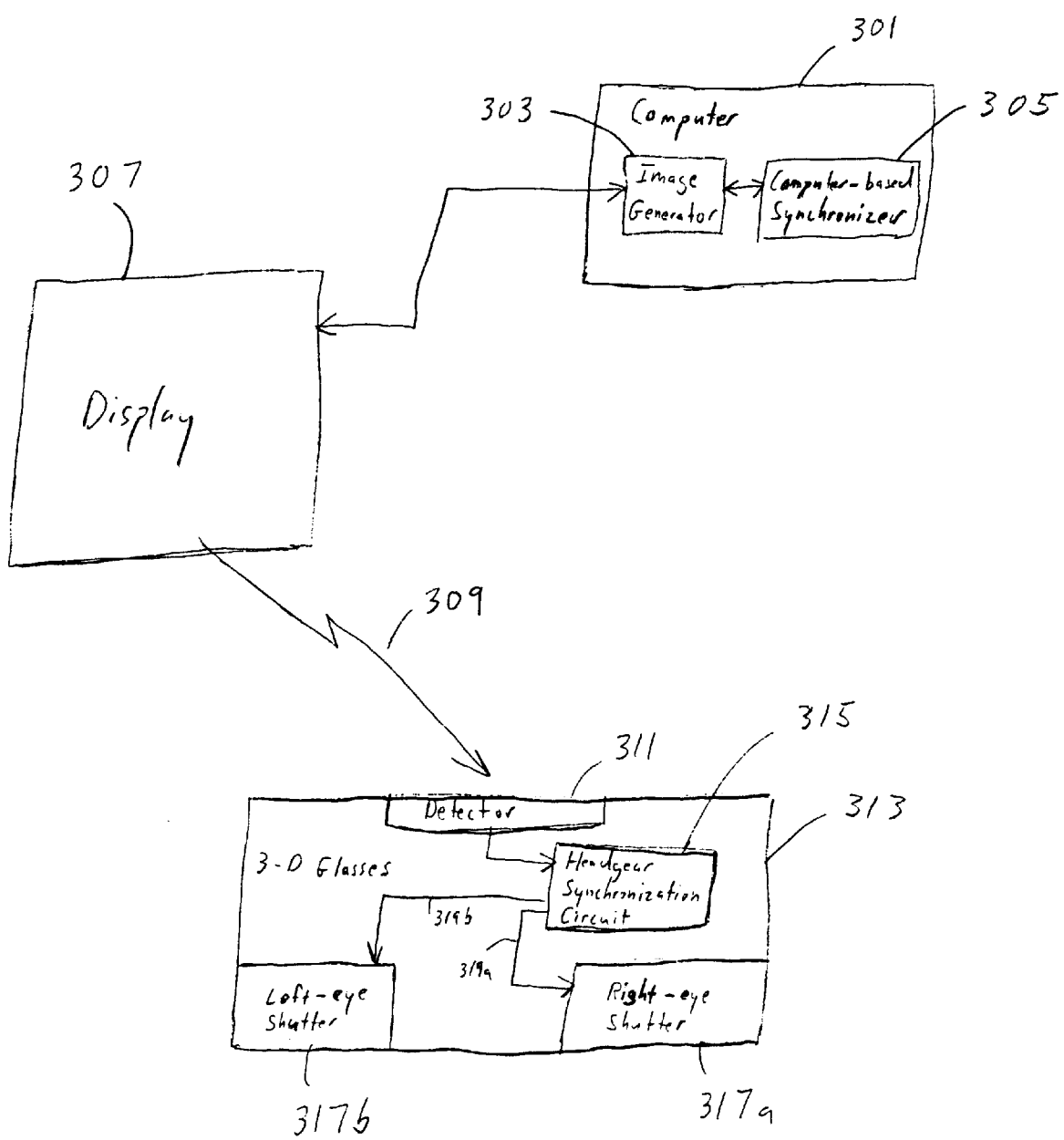

Fig. 4

Step 1. A user initiates the synchronization process by using an input means (such as a keyboard) to command Computer-based Synchronizer 305 to direct Image Generator 303 to display the Initial Synchronization Sequence 309 on Display 307.

Step 2. The Initial Synchronization Sequence 309 is identified by Detector 311 of 3-D Glasses 313.

Step 3. Detector 311 notifies Headgear Synchronization Circuit 315 that the Initial Synchronization Sequence 309 has been received.

Step 4. Headgear Synchronization Circuit 315 cycles Right-eye Shutter 317a and Left-eye Shutter 317b at phases substantially 180 degrees out of phase with one another and at a predetermined frequency which substantially matches the frequency with which the Image Generator 303 shows right-eye and left-eye images on the Display 307.

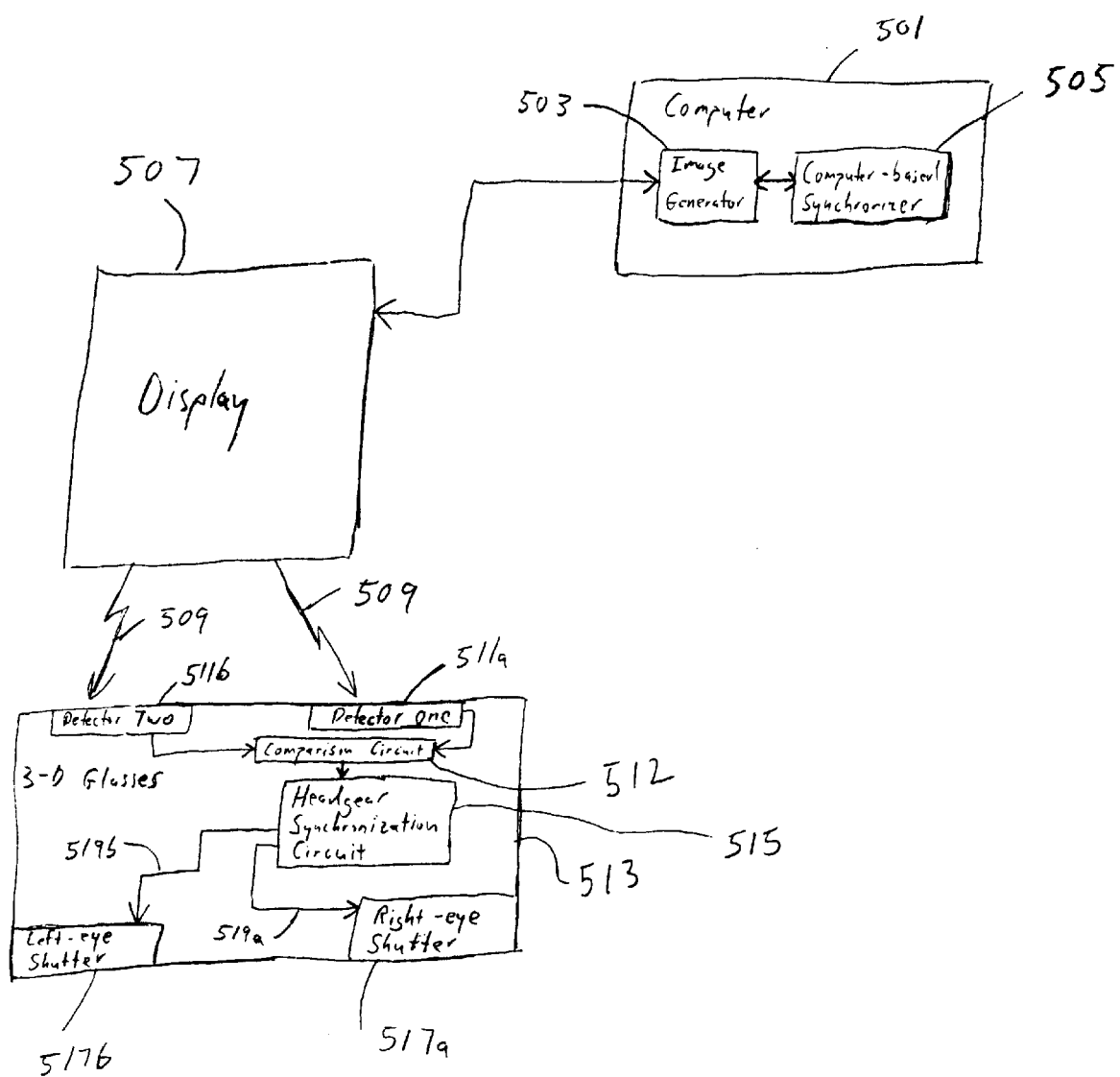

Fig. 6

Step 1. A user initiates the synchronization process by using an input means (such as a keyboard) to command Computer-based Synchronizer 505 to direct Image Generator 503 to display the Initial Synchronization Sequence 509 on Display 507.

Step 2. The Initial Synchronization Sequence 509 is identified by Comparison Circuit 512 using input from Detector One 511a and Detector Two 511b.

Step 3. the Comparison Circuit 512 notifies Headgear Synchronization Circuit 515 that the Initial Synchronization Sequence 509 has been received.

Step 4. Headgear Synchronization Circuit 515 cycles Right-eye Shutter 517a and Left-eye Shutter 517b at phases substantially 180 degrees out of phase with one another and at a predetermined frequency which substantially matches the frequency with which the Image Generator 503 shows right-eye and left-eye images on the Display 507.

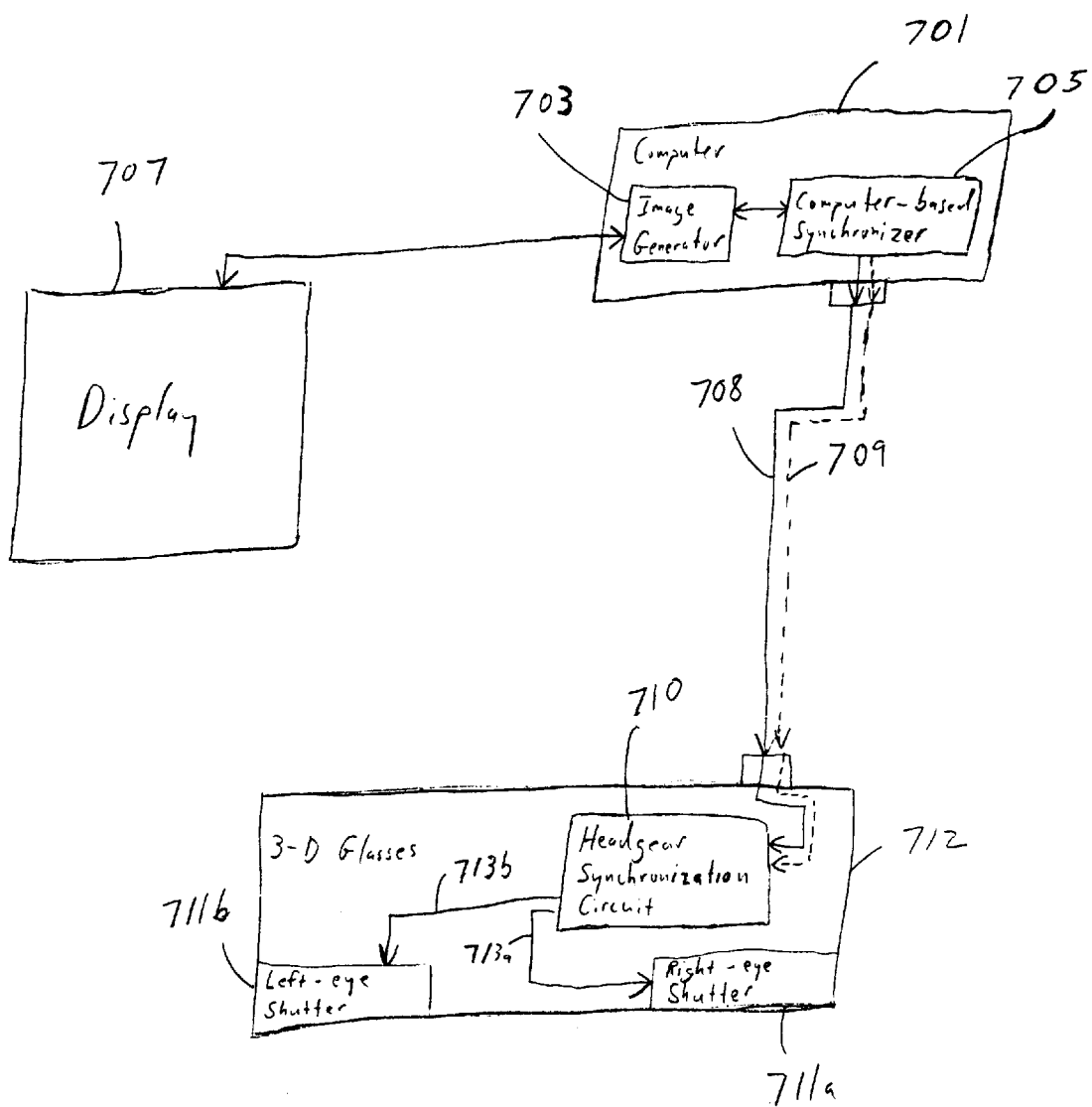

Fig. 8

Step 1. A user initiates the synchronization process by using an input means (such as a keyboard) to command Computer-based Synchronizer 705 to send the Initial Synchronization Signal 709 to the Headgear Synchronization Circuit 710 via Connection 708.

↓

Step 2. The Initial Synchronization Signal is received by Headgear Synchronization Circuit 710.

↓

Step 3. The Connection 708 may be broken by the user if desired at this point forward.

↓

Step 4. Headgear Synchronization Circuit 710 cycles Right-eye Shutter 711a and Left-eye Shutter 711b at phases substantially 180 degrees out of phase with one another and at a predetermined frequency which substantially matches the frequency with which the Image Generator 703 shows right-eye and left-eye images on the Display 707.

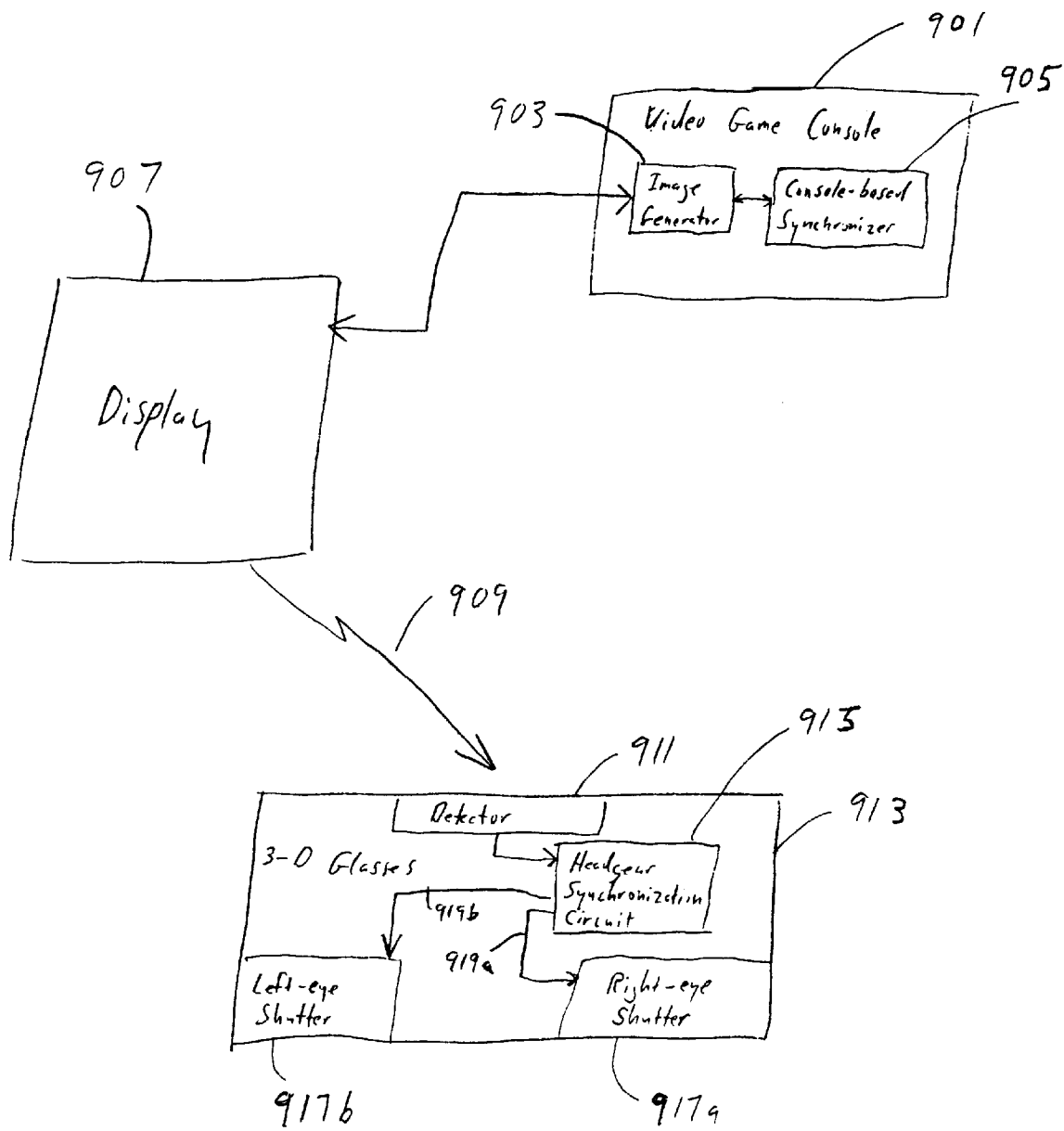

Fig. 12

Step 1. A user initiates the synchronization process by using an input means (such as a joystick) to command Console-based Synchronizer 1105 to direct Image Generator 1103 to display the Initial Synchronization Sequence 1109 on Display 1107.

Step 2. The Initial Synchronization Sequence 1109 is identified by Comparison Circuit 1112 using input from Detector One 1111a and Detector Two 1111b.

Step 3. The Comparison Circuit 1112 notifies Headgear Synchronization Circuit 1115 that the Initial Synchronization Sequence 1109 has been received.

Step 4. Headgear Synchronization Circuit 1115 cycles Right-eye Shutter 1117a and Left-eye Shutter 1117b at phases substantially 180 degrees out of phase with one another and at a predetermined frequency which substantially matches the frequency with which the Image Generator 1103 shows right-eye and left-eye images on the Display 1107.

Fig. 14

Step 1. A user initiates the synchronization process by using an input means (such as a joystick) to command Console-based Synchronizer 1305 to send the Initial Synchronization Signal 1309 to the Headgear Synchronization Circuit 1310 via Connection 1308.

Step 2. The Initial Synchronization Signal is received by Headgear Synchronization Circuit 1310.

Step 3. The Connection 1308 may be broken by the user if desired at this point forward.

Step 4. Headgear Synchronization Circuit 1310 cycles Right-eye Shutter 1311a and Left-eye Shutter 1311b at phases substantially 180 degrees out of phase with one another and at a predetermined frequency which substantially matches the frequency with which the Image Generator 1303 shows right-eye and left-eye images on the Display 1307.

SYSTEM AND METHOD TO SYNCHRONIZE ONE OR MORE SHUTTERS WITH A SEQUENCE OF IMAGES

CROSS-REFERENCE TO RELATED APPLICATIONS

This application claims the benefit under 35 U.S.C. 119(e) of U.S. Provisional Application Ser. No. 60/182,979, filed Feb. 16, 2000.

BACKGROUND OF THE INVENTION

1. Field of the Invention

The instant invention relates to a system and method to synchronize one or more shutters with a sequence of images.

More particularly, the instant invention relates to a system and method to synchronize one or more shutters on user-worn headgear with a sequence of images shown on a display by initially synchronizing the shutter(s) with the sequence of images using an initial synchronization signal generated externally to the headgear and by maintaining synchronization of the shutter(s) with the sequence of images using an ongoing synchronization signal generated independently by the headgear.

2. Description of the Related Art

Stereoscopic 3-D viewing systems for video games, computer graphics, movies, and the like are well known. In summary, they operate by showing a sequence of interlaced right-eye images and left-eye images on a display, by closing a right-eye shutter to block a viewer's view of the display when a left-eye image is shown, and by closing a left-eye shutter to block the viewer's view of the display when a right-eye image is show.

More particularly, as seen in the prior art system of FIG. 1, Control Unit 101 (which may be computer, a video game, or a movie projector) includes Image Generator 103, which provides a sequence of images to Display 105. The sequence of images is composed of a sequence of interlaced right-eye images and left-eye images. Synchronizing Circuit 107, which controls the timing of the images generated by Image Generator 103, also provides an Ongoing Synchronization Signal 109a to Infrared Transmitter 111 through Connection 112. The Ongoing Synchronization Signal 109a, which is transmitted in infrared form as Ongoing Synchronization Signal 109b to Infrared Detector 113 of 3-D Glasses 115, is used by Control Circuit 117 of 3-D Glasses 115 to synchronize the Right-eye Shutter 119a and the Left-eye shutter 119b of 3-D Glasses 115 with the right-eye and left-eye images shown on the display.

FIG. 2 shows another prior art system which is similar to the system shown in FIG. 1 but uses a hard-wired connection to carry the Ongoing Synchronization Signal to the 3-D Glasses. More particularly, it is seen in this FIG. 2 that Control Unit 201 (which may be computer, a video game, or a movie projector) includes Image Generator 203, which provides a sequence of images to Display 205. The sequence of images is composed of a sequence of interlaced right-eye images and left-eye images. Synchronizing Circuit 207, which controls the timing of the images generated by Image Generator 203, also provides an Ongoing Synchronization Signal 209 to 3-D Glasses 213 through hard-wired link 211. The Ongoing Synchronization Signal 209 is used by Control Circuit 215 of 3-D Glasses 213 to synchronize the Right-eye Shutter 217a and Left-eye Shutter 217b of 3-D Glasses 213 with the right-eye and left-eye images shown on the display.

Such prior art systems suffer a number of disadvantages. With regard to the system of FIG. 1, which employs the wireless delivery of the Ongoing Synchronization Signal, the use of a wireless transmitter such as an infrared transmitter increases the cost of the system. With regard to the system of FIG. 2, which employs the hard-wired delivery of the Ongoing Synchronization Signal, the wire connecting the 3-D Glasses to the Control Unit restricts movement and is clearly inconvenient to the viewer.

OBJECTS AND SUMMARY OF THE INVENTION

It is therefore an object of the present invention to provide a system and method to synchronize one or more shutters on user-worn headgear with a sequence of images shown on a display by initially synchronizing the shutter(s) with the sequence of images using an initial synchronization signal generated externally to the headgear and by maintaining synchronization of the shutter(s) with the sequence of images using an ongoing synchronization signal generated independently by the headgear. The initial synchronization signal generated externally to the headgear may be transmitted to the headgear through a hard-wired link which may be broken after the transmission of the initial synchronization signal. Alternatively, the initial synchronization signal generated externally to the headgear may be transmitted (preferably as visible light) to the headgear from the display upon which the sequence of images is shown.

Thus, the system and method of the instant invention eliminate the need for a continuous hard-wired connection to transmit an ongoing synchronization signal to the headgear. The system and method of the instant invention also eliminate the need to use a dedicated wireless transmitter to transmit an ongoing synchronization signal to the headgear.

Other objects and advantages will become apparent from the detailed description, claims, and accompanying drawings.

BRIEF DESCRIPTION OF THE DRAWINGS

FIG. 2 shows a block diagram of another prior art stereoscopic viewing system;

FIG. 3 shows a block diagram of a first embodiment of the present invention;

FIG. 4 shows a flowchart describing the operation of the first embodiment of the present invention;

FIG. 5 shows a block diagram of a second embodiment of the present invention;

FIG. 6 shows a flowchart describing the operation of the second embodiment of the present invention;

FIG. 7 shows a block diagram of a third embodiment of the present invention;

FIG. 8 shows a flowchart describing the operation of the third embodiment of the present invention;

FIG. 9 shows a block diagram of a fourth embodiment of the present invention;

FIG. 12 shows a flowchart describing the operation of the fifth embodiment of the present invention;

FIG. 14 shows a flowchart describing the operation of the sixth embodiment of the present invention.

DETAILED DESCRIPTION OF THE PREFERRED EMBODIMENTS

Figure 1:
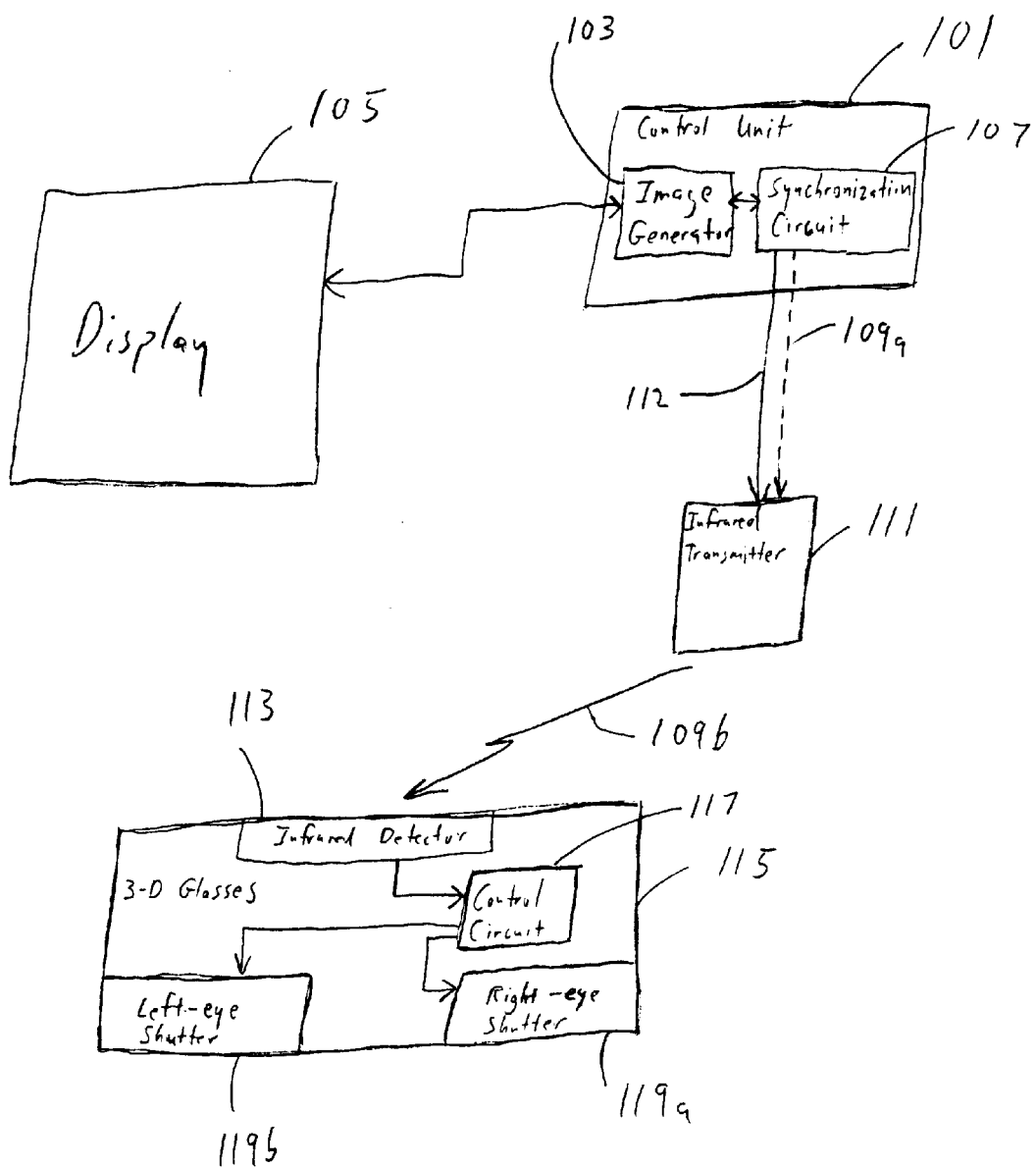
FIG. 1 shows a block diagram of a prior art stereoscopic viewing system.

A system for cycling a right-eye shutter between a substantially transparent state and a substantially opaque state in substantial synchronism with a right-eye sequence of images shown on a display and for cycling a left-eye shutter between a substantially opaque state and a substantially transparent state in substantial synchronism with a left-eye sequence of images shown on the display is provided, comprising cycling means for cycling the right-eye shutter between the substantially transparent state and the substantially opaque state at a predetermined frequency and for cycling the left-eye shutter between the substantially transparent state and the substantially opaque state at the predetermined frequency; and synchronization means for synchronizing the cycling means with the image sequences shown on the display by detecting at least one synchronization image displayed on the display.

A system for cycling a right-eye shutter of a shutter system between a substantially transparent state and a substantially opaque state in substantial synchronism with a right-eye sequence of images generated by a control unit external to the shutter system and for cycling a left-eye shutter of the shutter system between a substantially opaque state and a substantially transparent state in substantial synchronism with a left-eye sequence of images generated by the control unit is provided, comprising cycling means for cycling the right-eye shutter between the substantially transparent state and the substantially opaque state at a predetermined frequency and for cycling the left-eye shutter between the substantially transparent state and the substantially opaque state at the predetermined frequency; and synchronization means for synchronizing the cycling means with the image sequences shown on the display by detecting a synchronization signal provided by the control means via a breakable hard-wired connection.

A system for cycling a shutter between a substantially transparent state and a substantially opaque state in substantial synchronism with a sequence of images shown on a display is provided, comprising cycling means for cycling the shutter between the substantially transparent state and the substantially opaque state at a predetermined frequency; and synchronization means for synchronizing the cycling means with the sequence of images shown on the display by detecting at least one synchronization image displayed on the display.

A system for cycling a shutter of a shutter system between a substantially transparent state and a substantially opaque state in substantial synchronism with a sequence of images generated by a control unit external to the shutter system is provided, comprising cycling means for cycling the shutter between the substantially transparent state and the substantially opaque state at a predetermined frequency; and synchronization means for synchronizing the cycling means with the image sequences shown on the display by detecting a synchronization signal provided by the control means via a breakable hard-wired connection.

The right-eye image sequence and the left-eye image sequence may be displayed on the display in a time-multiplexed fashion, wherein the cycling means places the right-eye shutter in the substantially transparent state and the left-eye shutter in the substantially opaque state when the right-eye image sequence is displayed and wherein the cycling means places the right-eye shutter in the substantially opaque state and the left-eye shutter in the substantially transparent state when the left-eye image is displayed.

The cycling means may cycle the right eye shutter and the left-eye shutter in phases substantially 180 degrees apart from one another. The right-eye shutter and the left-eye shutter may be liquid crystal shutters. The predetermined frequency at which the right-eye shutter and left-eye shutter are cycled may substantially match or be a multiple of a refresh frequency of the display. The synchronization means may include a light-sensitive element for detecting the at least one synchronization image displayed on the display. The shutter system may be a head-mounted shutter system.

A method for cycling a right-eye shutter between a substantially transparent state and a substantially opaque state in substantial synchronism with a right-eye sequence of images shown on a display and for cycling a left-eye shutter between a substantially opaque state and a substantially transparent state in substantial synchronism with a left-eye sequence of images shown on the display is provided, comprising cycling the right-eye shutter between the substantially transparent state and the substantially opaque state at a predetermined frequency; cycling the left-eye shutter between the substantially transparent state and the substantially opaque state at the predetermined frequency; and synchronizing the cycling of the right-eye shutter and the left-eye shutter with the image sequences shown on the display by detecting at least one synchronization image displayed on the display.

A method for cycling a right-eye shutter of a shutter system between a substantially transparent state and a substantially opaque state in substantial synchronism with a right-eye sequence of images generated by a control unit external to the shutter system and for cycling a left-eye shutter of the shutter system between a substantially opaque state and a substantially transparent state in substantial synchronism with a left-eye sequence of images generated by the control unit is provided, comprising cycling the right-eye shutter between the substantially transparent state and the substantially opaque state at a predetermined frequency; cycling the left-eye shutter between the substantially transparent state and the substantially opaque state at the predetermined frequency; and synchronizing the cycling of the right-eye shutter and left-eye shutter with the image sequences shown on the display by detecting a synchronization signal provided by the control means via a breakable hard-wired connection.

A method for cycling a shutter between a substantially transparent state and a substantially opaque state in substantial synchronism with a sequence of images shown on a display is provided, comprising cycling the shutter between the substantially transparent state and the substantially opaque state at a predetermined frequency; and synchronizing the cycling of the shutter with the sequence of images shown on the display by detecting at least one synchronization image displayed on the display.

A method for cycling a shutter of a shutter system between a substantially transparent state and a substantially opaque state in substantial synchronism with a sequence of images generated by a control unit external to the shutter system is provided, comprising cycling the shutter between the substantially transparent state and the substantially opaque state at a predetermined frequency; and synchronizing the cycling of the shutter with the image sequences shown on the display by detecting a synchronization signal provided by the control means via a breakable hard-wired connection.

The right-eye image sequence and the left-eye image sequence may be displayed on the display in a time-multiplexed fashion, wherein the right-eye shutter is placed in the substantially transparent state and the left-eye shutter in the substantially opaque state when the right-eye image sequence is displayed and wherein the right-eye shutter is placed in the substantially opaque state and the left-eye shutter in the substantially transparent state when the left-eye image is displayed. The right-eye shutter and the left-eye shutter may be cycled in phases substantially 180 degrees apart from one another. The right-eye shutter and the left-eye shutter may be liquid crystal shutters. The predetermined frequency at which the right-eye shutter and left-eye shutter are cycled may substantially match or be a multiple of a refresh frequency of the display. The synchronization of the cycling of the right-eye shutter and the left-eye shutter with the image sequences shown on the display may be accomplished by utilizing a light-sensitive element for detecting the at least one synchronization image displayed on the display device. The shutter system may be a head-mounted shutter system.

Referring now to FIG. 3, a first embodiment of the instant invention is shown. As seen in this FIG. 3, Computer 301 (which may include input means such as a keyboard, a joystick, and a mouse, all of which are not shown) incorporates Image Generator 303 and Computer-based Synchronizer 305. Each of Image Generator 303 and Computer-based Synchronizer 305 may be implemented with hardware, with software, or with a combination of both. When directed by a user through input means such as a keyboard (not shown) associated with Computer 301 the Computer-based Synchronizer 305 directs Image Generator 303 to display an Initial Synchronization Sequence 309 on Display 307. This Initial Synchronization Sequence 309 may comprise a sequence of predetermined images. Thereafter, the Image Generator 303 sends to Display 307, under the timing control of Computer-based Synchronizer 305, a sequence of right-eye images and left-eye images corresponding to a computer simulation or game, for example.

In any case, the Initial Synchronization Sequence 309 is identified by Detector 311 of 3-D Glasses 313. Upon detection of the Initial Synchronization Sequence 309 the Detector 311 notifies Headgear Synchronization Circuit 315 that the Initial Synchronization Sequence 309 has been received. Headgear Synchronization Circuit 315 then begins cycling Right-eye Shutter 317a and Left-eye Shutter 317b between their transparent states and their opaque states. The Right-eye Shutter 317a and Left-eye Shutter 317b are cycled in response to Ongoing Synchronization Signal 319a and 319b from Headgear Synchronization Circuit 315. Headgear Synchronization Circuit 315 cycles Right-eye Shutter 317a and Left-eye Shutter 317b at phases substantially 180 degrees out of phase with one another and at a predetermined frequency which substantially matches the frequency with which the Image Generator 303 shows right-eye and left-eye images on the Display 307. Headgear Synchronization Circuit 315 may maintain synchronization using any suitable means, such as a Phase Locked Loop. In any case, suitable synchronization means are well known to those of ordinary skill in the art and shall not be described further.

Regarding the Initial Synchronization Sequence 309, this is preferably a predetermined sequence of dark and light images which may readily be detected by Detector 311. Alternatively, a single image may be utilized rather than a sequence of images. In yet another alternative, the Initial Synchronization Sequence 309 may be one or more images of a predetermined color, or containing predetermined data. In any case, the manner of implementing each of these coding and detection alternatives is well known to those of ordinary skill in the art and shall not be described further.

Referring now to FIG. 4, a flowchart describing the operation of the embodiment of FIG. 3 will now be described. As seen in this FIG. 3, at Step 1 a user initiates the synchronization process by using an input means (such as a keyboard) to command Computer-based Synchronizer 305 to direct Image Generator 303 to display the Initial Synchronization Sequence 309 on Display 307. There may preferably be a delay between the input by the user initiating the process and the display of the Initial Synchronization Sequence 309 in order to give the user time to position the 3-D Glasses 313 appropriately (that is, so that the Detector 311 has a line-of sight view of Display 307). At Step 2 the Initial Synchronization Sequence 309 is identified by Detector 311 of 3-D Glasses 313. At Step 3 the Detector 311 notifies Headgear Synchronization Circuit 315 that the Initial Synchronization Sequence 309 has been received. At Step 4 Headgear Synchronization Circuit 315 cycles Right-eye Shutter 317a and Left-eye Shutter 317b at phases substantially 180 degrees out of phase with one another and at a predetermined frequency which substantially matches the frequency with which the Image Generator 303 shows right-eye and left-eye images on the Display 307.

Referring now to FIG. 5, a second embodiment of the instant invention is shown. As seen in this FIG. 5, Computer 501 (which may include input means such as a keyboard, a joystick, and a mouse, all of which are not shown) incorporates Image Generator 503 and Computer-based Synchronizer 505. Each of Image Generator 503 and Computer-based Synchronizer 505 may be implemented with hardware, with software, or with a combination of both. When directed by a user through input means such as a keyboard (not shown) associated with Computer 501 the Computer-based Synchronizer 505 directs Image Generator 503 to display an Initial Synchronization Sequence 509 on Display 507. This Initial Synchronization Sequence 509 may comprise a sequence of predetermined images. Thereafter, the Image Generator 503 sends to Display 507, under the timing control of Computer-based Synchronizer 505, a sequence of right-eye images and left-eye images corresponding to a computer simulation or game, for example.

In any case, Detector One 511a and Detector Two 511b of 3-D Glasses 513 are placed adjacent the Display 507. Upon detection of stimulus such as light of a certain intensity or color each of Detector One 511a and Detector Two 511b notifies Comparison Circuit 512. Comparison Circuit 512 uses the input from Detector One 511a and Detector Two 511b to determine when Initial Synchronization Sequence 509 has been received. When Comparison Circuit 512 determines that the Initial Synchronization Signal 509 has been received it so notifies Headgear Synchronization Circuit 515. Headgear Synchronization Circuit 515 then begins cycling Right-eye Shutter 517a and Left-eye Shutter 517b between their transparent states and their opaque states. The Right-eye Shutter 517a and Left-eye Shutter 517b are cycled in response to Ongoing Synchronization Signal 519a and 519b from Headgear Synchronization Circuit 515. Headgear Synchronization Circuit 515 cycles Right-eye Shutter 517a and Left-eye Shutter 517b at phases substantially 180 degrees out of phase with one another and at a predetermined frequency which substantially matches the frequency with which the Image Generator 503 shows right-eye and left-eye images on the Display 507. Headgear Synchronization Circuit 515 may maintain synchronization using any suitable means, such as a Phase Locked Loop. In any case, suitable synchronization means are well known to those of ordinary skill in the art and shall not be described further.

Regarding the Initial Synchronization Sequence 509, this is preferably a predetermined sequence of images having predetermined light and dark areas which may readily be detected by Detector One 511a and Detector Two 511b. Each of the light and dark areas may preferably comprise one-half of the Display 507. Alternatively, a single image may be utilized rather than a sequence of images. In yet another alternative, the Initial Synchronization Sequence 509 may be one or more images of a predetermined color, or containing predetermined data. In any case, the manner of implementing each of these coding and detection alternatives is well known to those of ordinary skill in the art and shall not be described further.

Referring now to FIG. 6, a flowchart describing the operation of the embodiment of FIG. 5 will now be described. As seen in this FIG. 6, at Step 1 a user initiates the synchronization process by using an input means (such as a keyboard) to command Computer-based Synchronizer 505 to direct Image Generator 503 to display the Initial Synchronization Sequence 509 on Display 507. There may preferably be a delay between the input by the user initiating the process and the display of the Initial Synchronization Sequence 509 in order to give the user time to position the 3-D Glasses 513 appropriately (that is, so that the Detector One 511a and the Detector Two 511b are adjacent the Display 507). At Step 2 the Initial Synchronization Sequence 509 is identified by Comparison Circuit 512 using input from Detector One 511a and Detector Two 511b. At Step 3 the Comparison Circuit 512 notifies Headgear Synchronization Circuit 515 that the Initial Synchronization Sequence 509 has been received. At Step 4 Headgear Synchronization Circuit 515 cycles Right-eye Shutter 517a and Left-eye Shutter 517b at phases substantially 180 degrees out of phase with one another and at a predetermined frequency which substantially matches the frequency with which the Image Generator 503 shows right-eye and left-eye images on the Display 507.

Referring now to FIG. 7, a third embodiment of the instant invention is shown. This embodiment is similar to the first and second embodiments except that an Initial Synchronization Signal is carried from the Computer 701 to the 3-D Glasses 712 via a hardwired connection that may be broken after the Initial Synchronization Signal is received. In any case, as seen in this FIG. 7, Computer 701 (which may include input means such as a keyboard, a joystick, and a mouse, all of which are not shown) incorporates Image Generator 703 and Computer-based Synchronizer 705. Each of Image Generator 703 and Computer-based Synchronizer 705 may be implemented with hardware, with software, or with a combination of both. When directed by a user through input means such as a keyboard (not shown) associated with Computer 701 the Computer-based Synchronizer 705 directs Image Generator 703 to send Initial Synchronization Signal 709 to Headgear Synchronization Circuit 710 via Connection 708. Thereafter, the Image Generator 703 sends to Display 707, under the timing control of Computer-based Synchronizer 705, a sequence of right-eye images and left-eye images corresponding to a computer simulation or game, for example. The user may break Connection 708 after the Initial Synchronization Signal is sent to Headgear Synchronization Circuit 710.

In any case, after the Initial Synchronization Signal 709 has been received Headgear Synchronization Circuit 710 then begins cycling Right-eye Shutter 711a and Left-eye Shutter 711b between their transparent states and their opaque states. The Right-eye Shutter 711a and Left-eye Shutter 711b are cycled in response to Ongoing Synchronization Signal 713a and 713b from Headgear Synchronization Circuit 710. Headgear Synchronization Circuit 710 cycles Right-eye Shutter 711a and Left-eye Shutter 711b at phases substantially 180 degrees out of phase with one another and at a predetermined frequency which substantially matches the frequency with which the Image Generator 703 shows right-eye and left-eye images on the Display 707. Headgear Synchronization Circuit 710 may maintain synchronization using any suitable means, such as a Phase Locked Loop. In any case suitable synchronization means are well known to those of ordinary skill in the art and shall not be described further.

Referring now to FIG. 8, a flowchart describing the operation of the embodiment of FIG. 7 will now be described. As seen in this FIG. 8, at Step 1 a user initiates the synchronization process by using an input means (such as a keyboard) to command Computer-based Synchronizer 705 to send the Initial Synchronization Signal 709 to the Headgear Synchronization Circuit 710 via Connection 708. At Step 2 the Initial Synchronization Signal is received by Headgear Synchronization Circuit 710. At Step 3 the Connection 708 may be broken by the user if desired at this point forward. At Step 4 Headgear Synchronization Circuit 710 cycles Right-eye Shutter 711a and Left-eye Shutter 711b at phases substantially 180 degrees out of phase with one another and at a predetermined frequency which substantially matches the frequency with which the Image Generator 703 shows right-eye and left-eye images on the Display 707.

Regarding the Connection 708 it is noted that this may be any suitable connection for carrying the Initial Synchronization Signal 709 between the Computer-based Synchronizer 705 and the Headgear Synchronization Circuit 710. For example, a wire with easily connectable plugs or jacks at one or both ends may be used. In the alternative, there may be a more direct connection between the Computer 701 and the 3-D Glasses 712, such as mating electrical connections. In this regard it is noted that Computer-based Synchronizer 705 may send Initial Synchronization Signal 709 to Headgear Synchronization Circuit 710 whenever there is a connection between the two and thus no user input would be required to initiate the synchronization process.

Referring now to FIG. 9, a fourth embodiment of the instant invention is shown. As seen in this FIG. 9, Video Game Console 901 (which may include input means such as a joystick, which is not shown) incorporates Image Generator 903 and Console-based Synchronizer 905. Each of Image Generator 903 and Console-based Synchronizer 905 may be implemented with hardware, with software, or with a combination of both. When directed by a user through input means such as a joystick (not shown) associated with Video Game Console 901 the Console-based Synchronizer 905 directs Image Generator 903 to display an Initial Synchronization Sequence 909 on Display 907. This Initial Synchronization Sequence 909 may comprise a sequence of predetermined images. Thereafter, the Image Generator 903 sends to Display 907, under the timing control of Console-based Synchronizer 905, a sequence of right-eye images and left-eye images corresponding to a video game, for example.

In any case, the Initial Synchronization Sequence 909 is identified by Detector 911 of 3-D Glasses 913. Upon detection of the Initial Synchronization Sequence 909 the Detector 911 notifies Headgear Synchronization Circuit 915 that the Initial Synchronization Sequence 909 has been received. Headgear Synchronization Circuit 915 then begins cycling Right-eye Shutter 917a and Left-eye Shutter 917b between their transparent states and their opaque states. The Right-eye Shutter 917a and Left-eye Shutter 917b are cycled in response to Ongoing Synchronization Signal 919a and 919b from Headgear Synchronization Circuit 915. Headgear Synchronization Circuit 915 cycles Right-eye Shutter 917a and Left-eye Shutter 917b at phases substantially 180 degrees out of phase with one another and at a predetermined frequency which substantially matches the frequency with which the Image Generator 903 shows right-eye and left-eye images on the Display 907. Headgear Synchronization Circuit 915 may maintain synchronization using any suitable means, such as a Phase Locked Loop. In any case, suitable synchronization means are well known to those of ordinary skill in the art and shall not be described further.

Regarding the Initial Synchronization Sequence 909, this is preferably a predetermined sequence of dark and light images which may readily be detected by Detector 911. Alternatively, a single image may be utilized rather than a sequence of images. In yet another alternative, the Initial Synchronization Sequence 909 may be one or more images of a predetermined color, or containing predetermined data. In any case, the manner of implementing each of these coding and detection alternatives is well known to those of ordinary skill in the art and shall not be described further.

Figure 10:
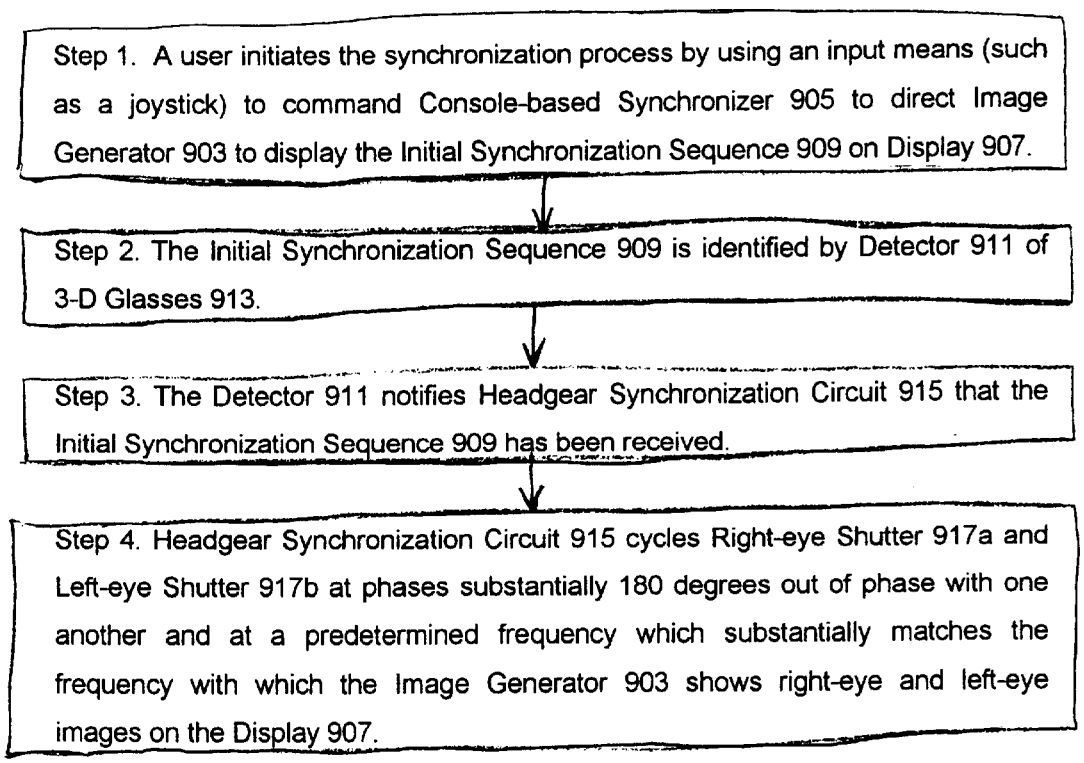
FIG. 10 shows a flowchart describing the operation of the fourth embodiment of the present invention.

Referring now to FIG. 10, a flowchart describing the operation of the embodiment of FIG. 9 will now be described. As seen in this FIG. 9, at Step 1 a user initiates the synchronization process by using an input means (such as a joystick) to command Console-based Synchronizer 905 to direct Image Generator 903 to display the Initial Synchronization Sequence 909 on Display 907. There may preferably be a delay between the input by the user initiating the process and the display of the Initial Synchronization Sequence 909 in order to give the user time to position the 3-D Glasses 913 appropriately (that is, so that the Detector 911 has a line-of sight view of Display 907). At Step 2 the Initial Synchronization Sequence 909 is identified by Detector 911 of 3-D Glasses 913. At Step 3 the Detector 911 notifies Headgear Synchronization Circuit 915 that the Initial Synchronization Sequence 909 has been received. At Step 4 Headgear Synchronization Circuit 915 cycles Right-eye Shutter 917a and Left-eye Shutter 917b at phases substantially 180 degrees out of phase with one another and at a predetermined frequency which substantially matches the frequency with which the Image Generator 903 shows right-eye and left-eye images on the Display 907.

Figure 11:
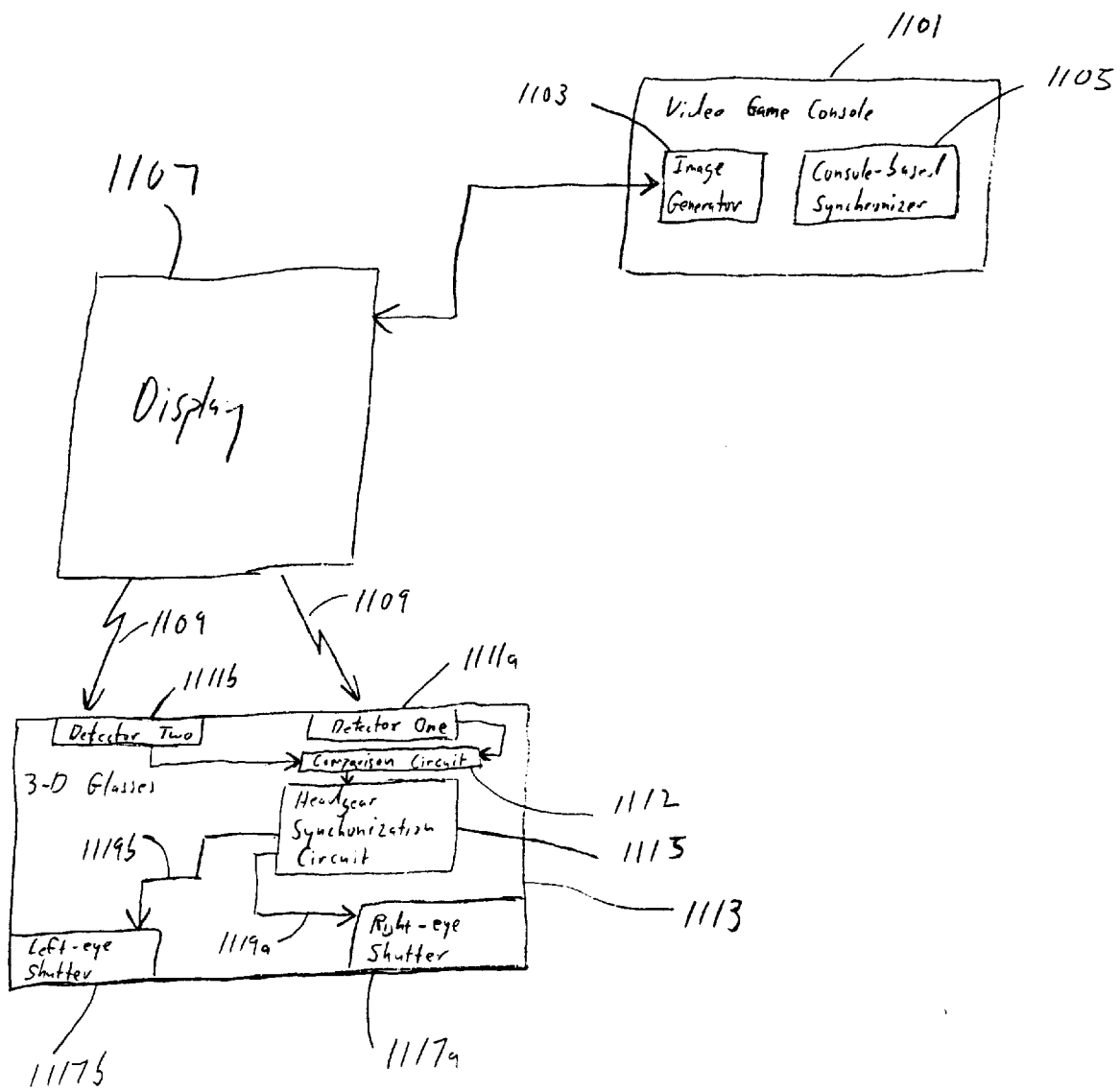
FIG. 11 shows a block diagram of a fifth embodiment of the present invention.

Referring now to FIG. 11, a fifth embodiment of the instant invention is shown. As seen in this FIG. 11, Video Game Console 1101 (which may include input means such as a joystick, which is not shown) incorporates Image Generator 1103 and Console-based Synchronizer 1105. Each of Image Generator 1103 and Console-based Synchronizer 1105 may be implemented with hardware, with software, or with a combination of both. When directed by a user through input means such as a joystick (not shown) associated with Video Game Console 1101 the Console-based Synchronizer 1105 directs Image Generator 1103 to display an Initial Synchronization Sequence 1109 on Display 1107. This Initial Synchronization Sequence 1109 may comprise a sequence of predetermined images. Thereafter, the Image Generator 1103 sends to Display 1107, under the timing control of Console-based Synchronizer 1105, a sequence of right-eye images and left-eye images corresponding to a video game, for example.

In any case, Detector One 1111a and Detector Two 1111b of 3-D Glasses 1113 are placed adjacent the Display 1107.

Upon detection of stimulus such as light of a certain intensity or color each of Detector One 1111a and Detector Two 1111b notifies Comparison Circuit 1112. Comparison Circuit 1112 uses the input from Detector One 1111a and Detector Two 1111b to determine when Initial Synchronization Sequence 1109 has been received. When Comparison Circuit 1112 determines that the Initial Synchronization Signal 1109 has been received it so notifies Headgear Synchronization Circuit 1115. Headgear Synchronization Circuit 1115 then begins cycling Right-eye Shutter 1117a and Left-eye Shutter 1117b between their transparent states and their opaque states. The Right-eye Shutter 1117a and Left-eye Shutter 1117b are cycled in response to Ongoing Synchronization Signal 1119a and 1119b from Headgear Synchronization Circuit 1115. Headgear Synchronization Circuit 1115 cycles Right-eye Shutter 1117a and Left-eye Shutter 1117b at phases substantially 180 degrees out of phase with one another and at a predetermined frequency which substantially matches the frequency with which the Image Generator 1103 shows right-eye and left-eye images on the Display 1107. Headgear Synchronization Circuit 1115 may maintain synchronization using any suitable means, such as a Phase Locked Loop. In any case, suitable synchronization means are well known to those of ordinary skill in the art and shall not be described further.

Regarding the Initial Synchronization Sequence 1109, this is preferably a predetermined sequence of images having predetermined light and dark areas which may readily be detected by Detector One 1111a and Detector Two 1111b. Each of the light and dark areas may preferably comprise one-half of the Display 1107. Alternatively, a single image may be utilized rather than a sequence of images. In yet another alternative, the Initial Synchronization Sequence 1109 may be one or more images of a predetermined color, or containing predetermined data. In any case, the manner of implementing each of these coding and detection alternatives is well known to those of ordinary skill in the art and shall not be described further.

Referring now to FIG. 12, a flowchart describing the operation of the embodiment of FIG. 11 will now be described. As seen in this FIG. 12, at Step 1 a user initiates the synchronization process by using an input means (such as a joystick) to command Console-based Synchronizer 1105 to direct Image Generator 1103 to display the Initial Synchronization Sequence 1109 on Display 1107. There may preferably be a delay between the input by the user initiating the process and the display of the Initial Synchronization Sequence 1109 in order to give the user time to position the 3-D Glasses 1113 appropriately (that is, so that the Detector One 1111a and the Detector Two 1111b are adjacent the Display 1107). At Step 2 the Initial Synchronization Sequence 1109 is identified by Comparison Circuit 1112 using input from Detector One 1111a and Detector Two 1111b. At Step 3 the Comparison Circuit 1112 notifies Headgear Synchronization Circuit 1115 that the Initial Synchronization Sequence 1109 has been received. At Step 4 Headgear Synchronization Circuit 1115 cycles Right-eye Shutter 1117a and Left-eye Shutter 1117b at phases substantially 180 degrees out of phase with one another and at a predetermined frequency which substantially matches the frequency with which the Image Generator 1103 shows right-eye and left-eye images on the Display 1107.

Figure 13:
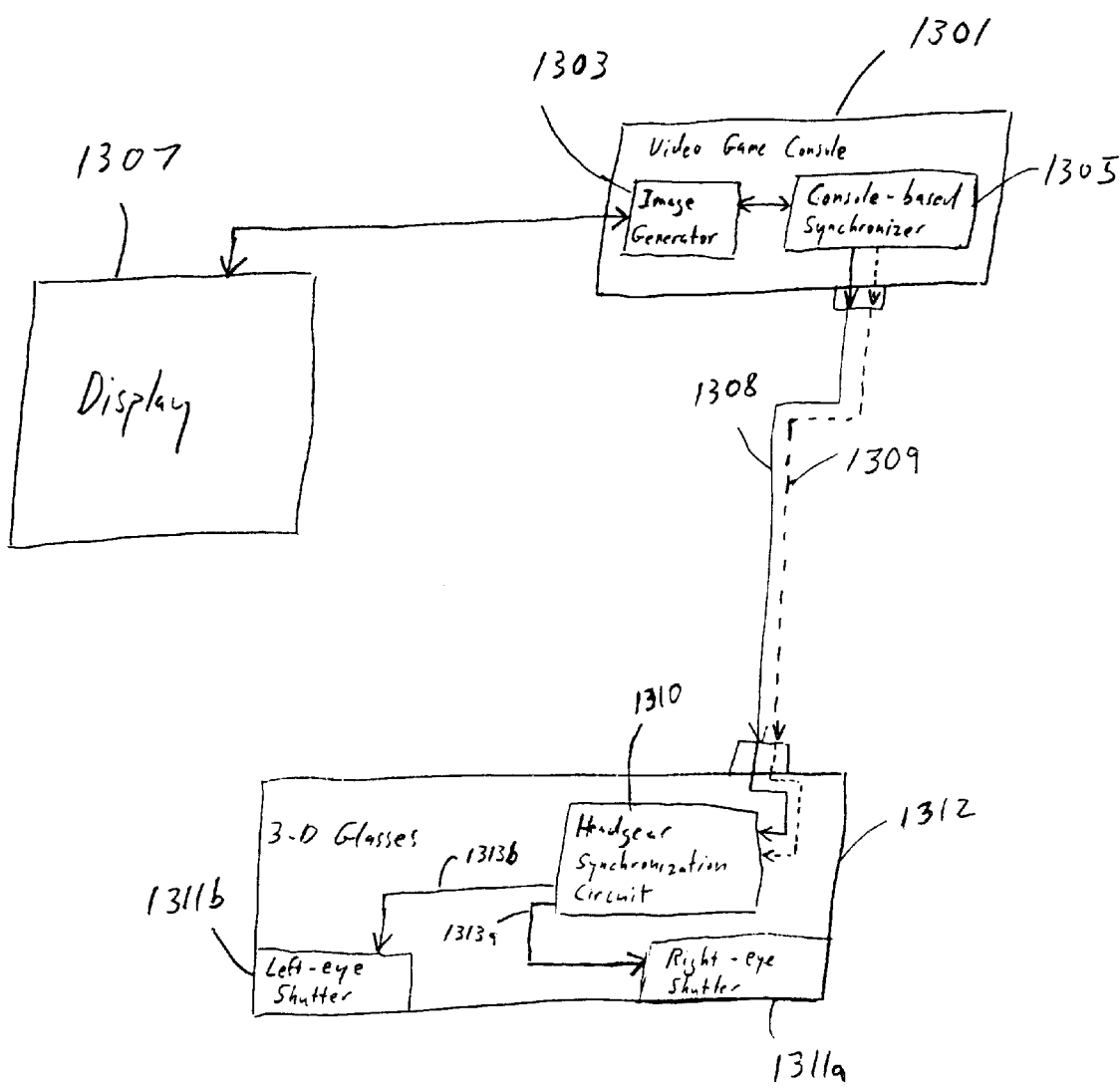
FIG. 13 shows a block diagram of a sixth embodiment of the present invention.

Referring now to FIG. 13, a sixth embodiment of the instant invention is shown. This embodiment is similar to the fourth and fifth embodiments except that an Initial Synchronization Signal is carried from the Video Game Console 1301 to the 3-D Glasses 1312 via a hard-wired connection that may be broken after the Initial Synchronization Signal is received. In any case, as seen in this FIG. 13, Video Game Console 1301 (which may include input means such as a joystick, which is not shown) incorporates Image Generator 1303 and Console-based Synchronizer 1305. Each of Image Generator 1303 and Console-based Synchronizer 1305 may be implemented with hardware, with software, or with a combination of both. When directed by a user through input means such as a joystick (not shown) associated with Video Game Console 1301 the Console-based Synchronizer 1305 directs Image Generator 1303 to send Initial Synchronization Signal 1309 to Headgear Synchronization Circuit 1310 via Connection 1308. Thereafter, the Image Generator 1303 sends to Display 1307, under the timing control of Console-based Synchronizer 1305, a sequence of right-eye images and left-eye images corresponding to a video game, for example. The user may break Connection 1308 after the Initial Synchronization Signal is sent to Headgear Synchronization Circuit 1310.

In any case, after the Initial Synchronization Signal 1309 has been received Headgear Synchronization Circuit 1310 then begins cycling Right-eye Shutter 1311a and Left-eye Shutter 1311b between their transparent states and their opaque states. The Right-eye Shutter 1311a and Left-eye Shutter 1311b are cycled in response to Ongoing Synchronization Signal 1313a and 1313b from Headgear Synchronization Circuit 1310. Headgear Synchronization Circuit 1310 cycles Right-eye Shutter 1311a and Left-eye Shutter 1311b at phases substantially 180 degrees out of phase with one another and at a predetermined frequency which substantially matches the frequency with which the Image Generator 1303 shows right-eye and left-eye images on the Display 1307. Headgear Synchronization Circuit 1310 may maintain synchronization using any suitable means, such as a Phase Locked Loop. In any case, suitable synchronization means are well known to those of ordinary skill in the art and shall not be described further.

Referring now to FIG. 14, a flowchart describing the operation of the embodiment of FIG. 13 will now be described. As seen in this FIG. 14, at Step 1 a user initiates the synchronization process by using an input means (such as a joystick) to command Console-based Synchronizer 1305 to send the Initial Synchronization Signal 1309 to the Headgear Synchronization Circuit 1310 via Connection 1308. At Step 2 the Initial Synchronization Signal is received by Headgear Synchronization Circuit 1310. At Step 3 the Connection 1308 may be broken by the user if desired at this point forward. At Step 4 Headgear Synchronization Circuit 1310 cycles Right-eye Shutter 1311a and Left-eye Shutter 1311b at phases substantially 180 degrees out of phase with one another and at a predetermined frequency which substantially matches the frequency with which the Image Generator 1303 shows right-eye and left-eye images on the Display 1307.

Regarding the Connection 1308 it is noted that this may be any suitable connection for carrying the Initial Synchronization Signal 1309 between the Console-based Synchronizer 1305 and the Headgear Synchronization Circuit 1310. For example, a wire with easily connectable plugs or jacks at one or both ends may be used. In the alternative, there may be a more direct connection between the Video Game Console 1301 and the 3-D Glasses 1312, such as mating electrical connections. In this regard it is noted that Console-based Synchronizer 1305 may send Initial Synchronization Signal 1309 to Headgear Synchronization Circuit 1310 whenever there is a connection between the two and thus no user input would be required to initiate the synchronization process.

While a number of embodiments of the instant invention have been described, it is understood that these embodiments are illustrative only, and not restrictive, and that many modifications may become apparent to those of ordinary skill in the art. For example, while the embodiments described refer principally to simulations and games played on computers and video game consoles, the instant invention may of course be applied to other display systems and other content, such as movies, broadcast television, recorded video (i.e., VCR's, Video Disks, DVD's, etc), and digital media files, to name a few. Further, while the embodiments described refer principally to 3-D imaging systems, the instant invention may of course be applied to other imaging systems using shutters which must be synchronized with a sequence of images, such as described in U.S. Pat. No. 5,892,505 to Tropper relating to an apparatus and method for displaying on a display screen a first image sequence exclusively to a first viewer and a second image sequence exclusively to a second viewer. Further still, it is noted that embodiments of the instant invention utilizing detector(s) to detect an Initial Synchronization Sequence may employ a moveable shade or shutter over the detector(s) which blocks ambient light from reaching the detector(s) when the detector(s) are not in use. Further still, the headgear of the instant invention may include means for indicating when independent synchronization by the headgear is active. Such indicating means may comprise an LED or LCD, for example. Further still, while embodiments of the instant invention using 1 and 2 detector(s) for detecting the Initial Synchronization Sequence have been described any number of suitable detectors may of course be utilized.

What is claimed is:

1. A system for cycling a right-eye shutter between a substantially transparent state and a substantially opaque state in substantial synchronism with a right-eye sequence of images shown on a display and for cycling a left-eye shutter between a substantially opaque state and a substantially transparent state in substantial synchronism with a left-eye sequence of images shown on the display, comprising:

cycling means for cycling the right-eye shutter between the substantially transparent state and the substantially opaque state at a predetermined frequency and for cycling the left-eye shutter between the substantially transparent state and the substantially opaque state at the predetermined frequency; and synchronization means for synchronizing the cycling means with the image sequences shown on the display by detecting at least one synchronization image displayed on the display;

wherein the cycling means cycles each of the right-eye shutter and the left-eye shutter at the predetermined frequency even after the synchronization image is no longer detected by the synchronization means.

2. The system of claim 1, wherein the right-eye image sequence and the left-eye image sequence are displayed on the display in a time-multiplexed fashion, wherein the cycling means places the right-eye shutter in the substantially transparent state and the left-eye shutter in the substantially opaque state when the right-eye image sequence is displayed, and wherein the cycling means places the right-eye shutter in the substantially opaque state and the left-eye shutter in the substantially transparent state when the left-eye image is displayed.

3. The system of claim 1, wherein the cycling means cycles the right eye shutter and the left-eye shutter in phases substantially 180 degrees apart from one another.

4. The system of claim 1, wherein the right-eye shutter and the left-eye shutter are liquid crystal shutters.

5. The system of claim 1, wherein the predetermined frequency at which the right-eye shutter and left-eye shutter are cycled is substantially equal to a refresh frequency of the display.

6. The system of claim 1, wherein the predetermined frequency at which the right-eye shutter and left-eye shutter are cycled is substantially equal to a multiple of a refresh frequency of the display.

7. The system of claim 1, wherein the synchronization means includes a light-sensitive element for detecting the at least one synchronization image displayed on the display.

8. The system of claim 1, wherein each of the right-eye shutter and the left-eye shutter is associated with a head-mounted shutter system.

9. A system for cycling a right-eye shutter of a shutter system between a substantially transparent state and a substantially opaque state in substantial synchronism with a right-eye sequence of images generated by a controller external to the shutter system and for cycling a left-eye shutter of the shutter system between a substantially opaque state and a substantially transparent state in substantial synchronism with a left-eye sequence of images generated by the controller, wherein each of the right-eye sequence of images and the left-eye sequence of images is shown on a display, comprising:

cycling means for cycling the right-eye shutter between the substantially transparent state and the substantially opaque state at a predetermined frequency and for cycling the left-eye shutter between the substantially transparent state and the substantially opaque state at the predetermined frequency; and synchronization means for synchronizing the cycling means with the image sequences shown on the display by detecting a synchronization signal provided by the controller via a breakable hard-wired connection;

wherein the cycling means cycles each of the right-eye shutter and the left-eye shutter at the predetermined frequency even after the breakable hard-wired connection is broken and the synchronization signal is no longer detected by the synchronization means.

10. The system of claim 9, wherein the right-eye image sequence and the left-eye image sequence are displayed on the display in a time-multiplexed fashion, wherein the cycling means places the right-eye shutter in the substantially transparent state and the left-eye shutter in the substantially opaque state when the right-eye image sequence is displayed, and wherein the cycling means places the right-eye shutter in the substantially opaque state and the left-eye shutter in the substantially transparent state when the left-eye image is displayed.

11. The system of claim 9, wherein the cycling means cycles the right eye shutter and the left-eye shutter in phases substantially 180 degrees apart from one another.

12. The system of claim 9, wherein the right-eye shutter and the left-eye shutter are liquid crystal shutters.

13. The system of claim 9, wherein the predetermined frequency at which the right-eye shutter and left-eye shutter are cycled is substantially equal to a refresh frequency of the display.

14. The system of claim 9, wherein the predetermined frequency at which the right-eye shutter and left-eye shutter are cycled is substantially equal to a multiple of a refresh frequency of the display.

15. The system of claim 9, wherein the shutter system is a head-mounted shutter system.

* * * * *